Aug. 9, 1966 G. W. SEULEN 3,265,958
BALANCING A POLYPHASE CIRCUIT WITH A SINGLE PHASE LOAD
Filed July 23, 1963

Inventor:
Gerhard Walter Seulen
By: Spencer & Kaye
Attorneys

United States Patent Office 3,265,958
Patented August 9, 1966

3,265,958
BALANCING A POLYPHASE CIRCUIT WITH A SINGLE PHASE LOAD
Gerhard Walter Seulen, Remscheid-Hasten, Germany, assignor to Allgemeine Elektricitates-Gesellschaft, Berlin-Grunewald, Germany, and Deutsche Edelstahlwerke Aktiengesellschaft, Krefeld, Germany
Filed July 23, 1963, Ser. No. 297,043
Claims priority, application Germany, July 23, 1962, A 40,787
9 Claims. (Cl. 323—76)

The present invention relates to a circuit arrangement for symmetrically distributing, i.e., balancing, the load of a polyphase alternating current net or current mains when a single phase load, as, for example, the induction coil of an induction furnace, is connected to the net.

A three-phase net, i.e., a net having three terminals with each respective phase appearing across one set of two terminals, should be balanced when a single phase load, such as the above-mentioned induction coil, is connected across two terminals constituting one of the three phases. This is conventionally done as follows: a choke coil, constituing an inductive reactance $X_L$ ($X_L = 2\pi fL$, where $f$ is the frequency of the alternating current net and L is the inductance in henrys), is connected between the third, free terminal of the net and one of the two terminals of the phase across which the heating coil is connected, while a capacitor, constituting a capacitative reactance $X_C$ ($X_C = \frac{1}{2}\pi fC$, where $f$ is again the frequency and $C$ is the capacitance in farads), is connected between the free terminal of the net and the other of the two terminals to which the heating coil is connected. The capacitor and the choke are so selected that the reactance of each is equal to $\sqrt{3}$ times the resonance resistance of the induction coil, the latter being compensated so that the load power factor or $\cos \phi = 1$.

If, however, the induction coil of the induction furnace is to operate at different loads, i.e., if the coil is to draw different amounts of current depending on the amount of heat to be generated, the net can be balanced only if the inductive and capacitative reactances connected between the phase in question and the free terminal have the proper valves of $X_L$ and $X_C$, respectively. This means that the choke and the capacitor have to be variable so as to make it possible to adjust their values, and hence the inductive and capacitative reactances, respectively, so as properly to balance the current drawn by the heating coil. The inductive reactance can be varied, for example, by providing the choke coil with a number of taps, or by connecting a plurality of chokes in parallel with each other, or by providing a choke which is pre-magnetized by means of a direct current so that the inductance of such a choke can be made infinitely variable by changing the pre-magnetizing current. The capacitative reactance can be varied by providing a plurality of different capacitors and connecting them in parallel with each other, as needed. One drawback of such arrangements is that they require a relatively large number of individual coils and hence are expensive. Another drawback is the fact that only a more or less coarse balance adjustment is the best that can be obtained.

It is, therefore, a primary object of the present invention to provide a balancing arrangement which overcomes the above drawbacks, and, with this object in view, the present invention resides, essentially, in a circuit arrangement for balancing a three-phase net having first, second and third terminals with each respective phase appearing across a set of two terminals, to which net a single-phase load is connected across the first and second terminals, the circuit arrangement comprising a fixed inductance connected across the first and third terminals, a plurality of capacitors, and a plurality of switching means, one for each of the capacitors, for connecting the respective capacitor either across the second and third terminals or across the first and third terminals, as desired, as a result of which the inductive reactance across the first and third terminals and the capacitative reactance across the second and third terminals may be increased together or decreased together.

Additional objects and advantages of the present invention will become apparent upon consideration of the following description when taken in conjunction with the accompanying drawing in which.

Figure 1:
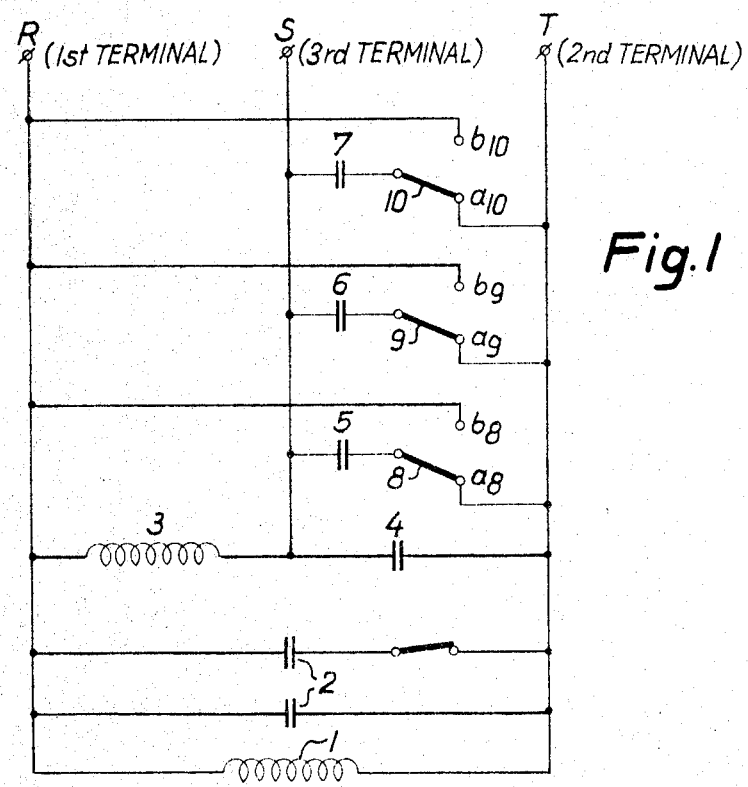
FIGURE 1 is a circuit diagram of one embodiment of the present invention.

Referring now to the drawing and to FIGURE 1 thereof in particular, the same shows a three-phase net or current mains, the three conductors being indicated at R, S, and T, respectively. For the sake of convenience, these three conductors are hereinafter referred to as the first, third and second terminals, respectively.

The load, shown here as an induction coil 1 of an induction furnace, is connected across the first and second terminals R and T, there being suitable capacitor means 2 connected in parallel with the coil 1 so as to compensate the reactance thereof to make the power factor, or $\cos \phi$, equal to 1. A choke coil 3, constituting a fixed, i.e., non-variable, inductive reactance, is connected across the first and third terminals R and S. The circuit further comprises a plurality of capacitors 4, 5, 6, 7, it being expedient, in practice, to provide capacitors having different capacitances. The capacitor 4 is permanently connected across the second and third terminals T and S, while one terminal of each of the capacitors 5, 6, 7, is connected to the third terminal S. A plurality of independently operable switching means 8, 9, 10, are connected to the other terminal of each of capacitors 5, 6, 7, respectively, which switching means serve to connect these capacitors either to the first terminal R or to the second terminal T, i.e., each of the switching means connects its respective capacitors either across the second and third terminals T and S (in positions $a_8$, $a_9$, $a_{10}$) or across the first and third terminals R and S (in positions $b_8$, $b_9$, $b_{10}$), in which latter case the respective capacitor is connected in parallel with the fixed inductance 3. The switching means may be manually operable or they may be actuated automatically, as will be described below.

The operation of the circuit is as follows:

It is assumed that the inductive reactance of the choke coil 3, as well as the total capacitative reactance of the capacitors 4, 5, 6, 7, are sufficiently large to balance the three-phase net when the induction coil 1 draws maximum current. At maximum current draw, the parts will be in the positions shown in FIGURE 1, i.e., the choke coil 3 will be the only reactance connected across the first and third terminals R and S while the capacitors 4, 5, 6, 7, will all be connected across the second and third terminals T and S. If, now, the power consumption of the induction coil 1 decreases, the inductive and capacitative reactances must likewise decrease in order to maintain the system in balance. According to the present invention, this is accomplished by switching one or more of the capacitors 5, 6, 7, from its connection across the second and third terminals T and S so as to be connected across the first and third terminals R and S. This means that a capacitative reactance which up to now was connected across the second and third terminals will now be connected across the first and third terminals. The fact that there is now a capacitative reactance in parellel with the inductive reactance of choke coil 3 will decrease the total reactance across the first and third terminals, i.e., the total reactance, which is still an inductive reactance, will now be smaller due to the presence of the capacitative reactance. Expressed in other terms, the capacitative reactance across the second and third terminals is decreased by an amount equal to that which the inductive reactance across the first and third terminals is decreased. Provided the proper amount of capacitative reactance is thus transferred, in a manner of speaking, from across the second and third terminals to across the first and third terminals, the system will remain in balance.

It will be appreciated that, by virtue of the circuit arrangement according to the present invention, something more is done than merely to remove a certain amount of capacitative reactance from across the second and third terminals; instead, the capacitative reactance removed from across the second and third terminals is at the same time placed across the first and third terminals, thereby effectively decreasing the inductive reactance of the choke coil by the same amount as the capacitative reactance across the second and third terminals is reduced. The inductive reactance across the first and third terminals and the capacitative reactance across the second and third terminals are therefore, decreased together. Conversely, if a capacitor across the first and third terminals is switched back to lie across the second and third terminals, the inductive and capacitative reactances are increased together.

The system according to the present invention has the advantage over prior art systems in that the need for a plurality of choke coils, connected in parallel, is eliminated. Instead, there is but one fixed choke coil which has an inductance sufficiently large to be able—in conjunction with the capacitative reactance across the second and third terminals—to balance the system when the induction coil is operating at maximum power output.

Figure 2:
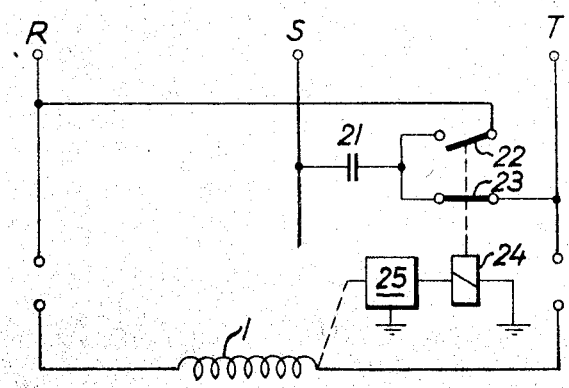
FIGURE 2 is a fragmentary circuit diagram of a modified embodiment of the present invention.

Instead of the double-throw switches 8, 9, 10, shown in FIGURE 1, the circuit may be equipped with two ganged single-throw switches 22, 23 which, as shown in FIGURE 2, will connect the capacitor 21 either across the first and third or across the second and third terminals, the arrangement being such that while one of the switches 22, 23, is open the other is closed, and vice versa. The switches 22, 23, are actuated by means of a relay coil 24 which is in circuit with a control device 25. The latter is connected to similar coils (not shown) which control the operation of switches connected to the other capacitors (also not shown in FIGURE 2), and is operatively associated with the circuit incorporating the induction coil 1 so as to be responsive to the power consumption of the load for automatically actuating the various switching means to connect the requisite balancing reactances across the first and second as well as across the first and third terminals. In practice, this may be accomplished by providing a connection between the adjusting means for the load and the switching means for the capacitors, or by providing a current-measuring device in the load circuit which controls the operation of the switches.

It will be understood that the above description of the present invention is susceptible to various modifications, changes, and adaptations, and the same are intended to be comprehended within the meaning and range of equivalents of the appended claims. For example, the switching means may be constituted by electronic means such as transistors which connect the various capacitors across the desired set of terminals.

What is claimed is:

1. A circuit arrangement for balancing a three-phase net having first, second and third terminals with each respective phase appearing across a set of two terminals, to which net a single-phase load is connected across said first and second terminals, said circuit arrangement comprising, in combination:
    (a) a fixed inductance connected across said first and third terminals;
    (b) a plurality of capacitors; and
    (c) a plurality of switching means, one for each of said capacitors, for connecting the respective capacitor either across said second and third terminals or across said first and third terminals, as desired, whereby the inductive reactance across said first and third terminals and the capacitative reactance across said second and third terminals may be increased together or decreased together.

2. A circuit arrangement as defined in claim 1 wherein each of said switching means comprises a double-throw switch movable between a first position in which the respective capacitor is connected between said first and third terminals and a second position in which the respective capacitor is connected between said second and third terminals.

3. A circuit arrangement as defined in claim 1 wherein each of said switching means comprises a first switch for connecting the respective capacitor between said first and third terminals, a second switch for connecting the respective capacitor between said second and third terminals, and ganging means coupling said switches to each other such that while one of them is open the other is closed, and vice versa.

4. A circuit arrangement as defined in claim 1 wherein said switching means are manually operable.

5. A circuit arrangement as defined in claim 1, further comprising means responsive to the power consumption of the load for automatically actuating said switching means to connect the requisite balancing reactances across said first and second as well as across said first and third terminals.

6. A circuit arrangement as defined in claim 1 wherein said load is an induction coil forming part of an induction furnace.

7. A circuit arrangement as defined in claim 1, further comprising an additional capacitor permanently connected across said second and third terminals.

8. A circuit arrangement as defined in claim 1, further comprising additional capacitor means connected across said load for compensating the latter so that its power factor is equal to 1.

9. A circuit arrangement as defined in claim 1 wherein said plurality of capacitors are capacitors having different capacitances.

References Cited by the Examiner

UNITED STATES PATENTS

| | | | |
|---|---|---|---|
| 2,777,983 | 1/1957 | Kummel | 321—58 |
| 3,040,231 | 6/1962 | Biringer | 321—58 |
| 3,053,920 | 9/1962 | Seitz | 13—26 |

LLOYD McCOLLUM, *Primary Examiner.*

A. D. PELLINEN, *Assistant Examiner.*